United States Patent Office 3,211,696
Patented Oct. 12, 1965

3,211,696
2-(2-HYDROXY-4-OCTYLOXYPHENYL)BENZO-TRIAZOLE AS POLYOLEFINS STABILIZERS
Ralph A. Coleman, Middlesex, and Jerry P. Milionis, South Bound Brook, N.J., assignors to American Cyanamid Company, New York, N.Y., a corporation of Maine
No Drawing. Filed Dec. 22, 1961, Ser. No. 161,439
4 Claims. (Cl. 260—45.8)

This invention relates to the provision of the compound 2-(2-hydroxy-4-octyloxyphenyl)benzotriazole. It relates further to the protection of polyolefins against the deteriorative action of ultraviolet light by the inclusion therein of a stabilizing amount of such a benzotriazole derivative.

It has been proposed to stabilize polymeric materials against ultraviolet light deterioration by the use of various types of benzotriazoles. Thus, a recent patent, U.S. 3,004,896, discloses for this purpose 2-phenylbenzotriazole derivatives having a 2-hydroxy and a 5-lower alkoxy substituent on the phenyl moiety. While this class of compounds is capable of providing effective protection for various types of polymers such as polyesters and polystyrenes, it has been found to be less than satisfactory in providing protection for polyolefin plastic materials.

It is an object of the present invention to provide ultraviolet absorbers of the benzotriazole capable of conferring a high degree of stability. It is a further object of this invention to provide polyolefin compositions which are highly stable against the deteriorative effects of ultraviolet light.

These and other objects have been accomplished in accordance with the present invention by the provision of the new compound 2-(2-hydroxy-4-octyloxyphenyl)-benzotriazole. It has been discovered that this derivative (whether the octyl radical is of the normal, secondary or other isomeric configuration) is eminently suitable for stabilizing polyolefin polymers against ultraviolet degradation.

The properties of the 2-(2-hydroxy-4-octyloxyphenyl)-benzothiazole, as hereinbefore described, are indeed surprising since chemically related analogs thereof are without these advantageous properties. Thus 2-(2-hydroxyphenyl)benzotriazoles having an alkoxy substituent in the 5-position of the phenyl moiety rather than the 4-position thereof tend to absorb a relatively large amount of light in the visible range and a relatively small amount of light in the ultraviolet range. This renders the latter unsatisfactory for protecting colorless polyolefins to which they import a yellow color; and only partially effective in protecting even colored polyolefins, since they are not capable of high absorption in the ultraviolet range. The beneficial properties of the compound of the present invention is unexpected for the additional reason that these properties are evident only when the compound is employed in polyolefinic substrates. Polyesters cannot be satisfactorily stabilized by employing the compound of the present invention.

It is an advantage of the present invention that any polyolefinic plastic such as polyethylene, polybutylene, polyproylene and copolymers thereof, may be stabilized by the practice thereof. For most purposes efficient stabilization is obtained by mixing the compound of this invention with the polyolefin to be stabilized in a concentration of about 0.1% on the weight of the polyolefin. However, as little as 0.01% or as much as 5.0% may be effectively used for specialized purposes as desired. The stabilized polyolefin may be prepared by conventional methods known to the art such as by mixing a polyolefin with the compound of this invention and then milling and molding the mixture to yield the stabilized polyolefin of this invention.

This invention is further illustrated by the examples which follow.

EXAMPLE 1

*2-(2-hydroxy-4-n-octyloxyphenyl)benzotriazole*

To a suspension of 11.35 g. of 2-(2,4-dihydroxyphenyl)benzotriazole, 7.00 g. of potassium carbonate and 100 ml. of acetone is added 9.65 g. of 1-bromooctane. The reaction mixture is refluxed for 24 hours and added to 400 ml. water. The crystalline material formed was filtered, dried and recrystallized from ethanol to give the product 2-(2-hydroxy-4-n-octyloxyphenyl)benzotriazole; M.P. 78–79° C.

UV absorption (toluene):

$\alpha_{max.}$ ---------------------------------- 75.0
$\epsilon_{max.}$ ---------------------------------- 25,400
$\lambda_{max.}$ ---------------------------------- m$\mu$ 345
$\alpha_{420}$ ---------------------------------- 0

The corresponding 2-ethylhexyloxy derivative was prepared by substituting 2-ethylhexyl bromide for the 1-bromooctane used in the foregoing procedure.

EXAMPLE 2

The ultraviolet absorber of Example 1 is incorporated at a concentration of 0.1% into low density polyethylene by milling. Sheets of a thickness of 0.010 inch are compression molded. The sheets are exposed in a Fade-Ometer and outdoors. Using an infrared spectrophotometer, the absorption due to the carbonyl content (5.8 microns) is determined. Relative absorption compared with the standard shows the relative increase in carbonyl resulting from deterioration in the sample exposed to ultraviolet light. The carbonyl group concentration is a direct indication of the deterioration which is taking place in the polyethylene. The results, in hours, to reach a certain carbonyl content and the percent carbonyl formed by outdoor exposure after 115 days are shown in the following table:

| Sample | Fade-Ometer, hrs. to reach 0.2% carbonyl content | Outdoors 115 days, percent C=0 |
|---|---|---|
| Control | 375 | 0.311 |
| 2-(2-hydroxy-4-octyl-oxyphenyl) benzotriazole | 550 | 0.184 |

Similar results are obtained when polypropylene or polybutylene is substituted in the procedure of Example 2.

EXAMPLE 3

100 parts of unstabilized polypropylene are dry blended with 0.25 part of 2-(2-hydroxy-4-n-octyloxyphenyl)-benzotriazole, the compound of Example 1. This blend is then fluxed for five minutes on a two roll mill with one roll at 330° F. and the other roll at 290° F. From this mix a 15 mil. thick sheet is compression molded for exposure tests.

A sample of the sheet, along with a control piece of sheet prepared in the same way, but without the ultraviolet absorber, is then exposed in a Fade-Ometer. The number of hours exposure before the brittle point of the plastic is reached is noted. The results are shown in the table.

Sample:

Hours in Fade-Ometer to reach brittle point

Control ---------------------------------- 20
2-(2-hydroxy-4-n-octyloxyphenyl)-
  benzotriazole ---------------------------------- 150

We claim:
1. 2-(2-hydroxy-4-octyloxyphenyl)benzotriazole.
2. A composition of mater stabilized against the de- teriorative effects of ultraviolet light comprising a polymer of an α-mono-olefin of 2–4 carbon atoms and from 0.01 to 5.0% on the weight of the polymer of 2-(2-hydroxy-4-octyloxyphenyl)benzotriazole.

3. The composition of claim 2 wherein the polymer is polyethylene.

4. The composition of claim 2 wherein the polymer is polypropylene.

References Cited by the Examiner

UNITED STATES PATENTS

| 3,004,896 | 10/61 | Heller et al. | 260—45.8 |
| 3,074,910 | 1/63 | Dickson | 260—45.75 |

LEON J. BERCOVITZ, *Primary Examiner.*

MILTON STERMAN, *Examiner.*